(12) United States Patent
Adams et al.

(10) Patent No.: US 10,667,057 B1
(45) Date of Patent: May 26, 2020

(54) SYSTEMS AND METHODS OF TRACKING USERS WITHIN A FACILITY

(71) Applicant: BlackBerry Limited, Waterloo (CA)

(72) Inventors: Neil Patrick Adams, Waterloo (CA); Edward Snow Willis, Ottawa (CA)

(73) Assignee: BlackBerry Limited, Waterloo, Ontario (CA)

( * ) Notice: Subject to any disclaimer, the term of this patent is extended or adjusted under 35 U.S.C. 154(b) by 0 days.

(21) Appl. No.: 16/367,535

(22) Filed: Mar. 28, 2019

(51) Int. Cl.
*H04R 3/12* (2006.01)
*G06F 3/16* (2006.01)
*G10L 17/00* (2013.01)

(52) U.S. Cl.
CPC ............. *H04R 3/12* (2013.01); *G06F 3/165* (2013.01); *G10L 17/005* (2013.01)

(58) Field of Classification Search
CPC ............. H04R 2227/005; H04R 27/00; H04R 2227/003; H04R 29/008; H04S 7/00; H04S 7/30; H04N 5/23216; H04W 64/00; H04W 84/18; H04W 88/02
USPC .................................. 381/56–58, 1; 700/94
See application file for complete search history.

(56) References Cited

U.S. PATENT DOCUMENTS

| | | | |
|---|---|---|---|
| 8,315,366 B2* | 11/2012 | Basart | H04M 15/06 379/142.01 |
| 9,729,994 B1* | 8/2017 | Eddins | H04S 7/302 |
| 10,080,088 B1* | 9/2018 | Yang | H04S 7/30 |
| 2010/0020951 A1 | 1/2010 | Basart et al. | |
| 2011/0285807 A1 | 11/2011 | Feng | |
| 2017/0019525 A1* | 1/2017 | Hannon | G01S 5/0036 |
| 2019/0166435 A1* | 5/2019 | Crow | H04R 25/505 |

* cited by examiner

*Primary Examiner* — Lun-See Lao
(74) *Attorney, Agent, or Firm* — Rowand LLP

(57) ABSTRACT

Systems and methods for tracking users within a facility. The facility includes two or more zones and each facility zone is associated with a respective acoustic device. The system includes a communication module, a processor, and memory storing processor executable instructions. The instructions, when executed, cause the processor to: receive a first acoustic input from a first acoustic device associated with a first zone and determine that the first acoustic input is associated with a first user. The instructions, when executed, further cause the processor to associate the first acoustic input with the first user. Using contextual data of the first user, the instructions, when executed, further cause the processor to confirm the association of the first acoustic input with the first user and associate a location of the first user with the first zone.

20 Claims, 6 Drawing Sheets

US 10,667,057 B1

SYSTEMS AND METHODS OF TRACKING USERS WITHIN A FACILITY

FIELD

The present application generally relates to location tracking and, in particular to systems and methods for tracking users within a facility.

BACKGROUND

Facilities, such as offices, manufacturing plants, schools, or the like, may include a building that spans a large parcel of land or multiple buildings spanning geographically separated locations. Such facilities may be sub-divided into several zones. Users or occupants of such facilities may move around the facility from zone to zone throughout a course of a day. In some scenarios, it may be desirable to identify user locations within a facility.

BRIEF DESCRIPTION OF THE DRAWINGS

Reference will now be made, by way of example, to the accompanying drawings which show example embodiments of the present application, and in which.

Similar reference numerals may have been used in different figures to denote similar components.

DESCRIPTION OF EXAMPLE EMBODIMENTS

Figure 1:
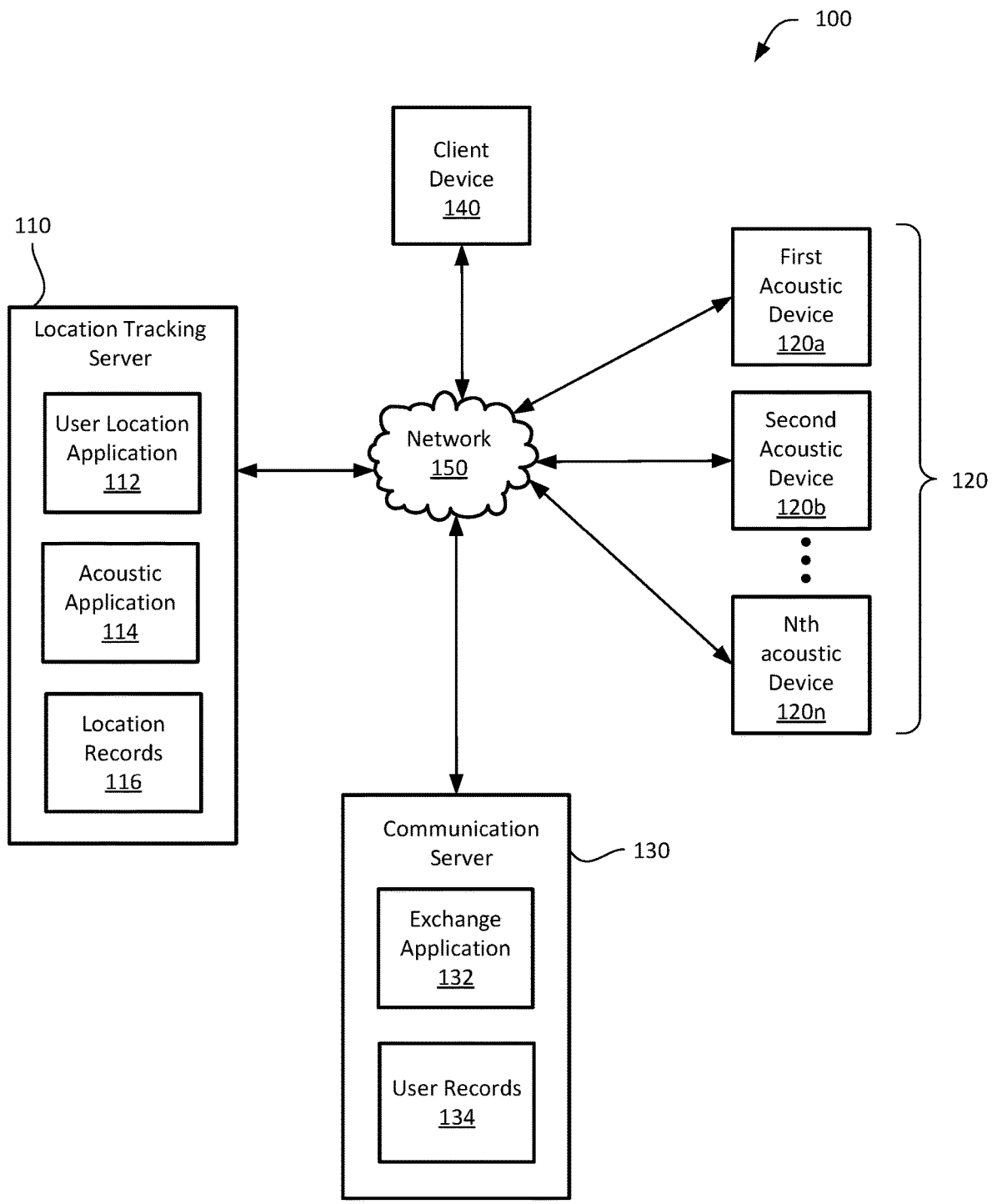
FIG. 1 diagrammatically illustrates a system for tracking users within a facility, in accordance with an example of the present application.

In a first aspect, the present application describes a system for tracking users within a facility, the facility including two or more zones, each zone being associated with a respective acoustic device of a plurality of network-connected acoustic devices. The system including: a communication module; a processor coupled to the communication module; and memory coupled to the processor storing processor executable instructions. The instructions, when executed, cause the processor to: receive a first acoustic input from a first acoustic device associated with a first zone; determine that the first acoustic input is associated with a first user; associate the first acoustic input with the first user; using contextual data of the first user, confirm the association of the first acoustic input with the first user; and associate a location of the first user with the first zone.

In another aspect, the present application describes a method of tracking users within a facility, the facility including two or more zones, each zone being associated with a respective acoustic device of a plurality of network-connected acoustic devices. The method includes: receiving a first acoustic input from a first acoustic device associated with a first zone; determining that the first acoustic input is associated with a first user; associating the first acoustic input with the first user; using contextual data of the first user, confirming the association of the first acoustic input with the first user; and associating a location of the first user with the first zone.

In yet a further aspect, the present application describes non-transitory computer-readable storage medium storing processor-readable instructions that, when executed, configure a processor to perform one or more of the methods described herein. In this respect, the term processor is intended to include all types of processing circuits or chips capable of executing program instructions.

Other aspects and features of the present application will be understood by those of ordinary skill in the art from a review of the following description of examples in conjunction with the accompanying figures.

In the present application, the terms "about", "approximately", and "substantially" are meant to cover variations that may exist in the upper and lower limits of the ranges of values, such as variations in properties, parameters, and dimensions. In a non-limiting example, the terms "about", "approximately", and "substantially" may mean plus or minus 10 percent or less.

In the present application, the term "and/or" is intended to cover all possible combinations and sub-combinations of the listed elements, including any one of the listed elements alone, any sub-combination, or all of the elements, and without necessarily excluding additional elements.

In the present application, the phrase "at least one of . . . or . . . " is intended to cover any one or more of the listed elements, including any one of the listed elements alone, any sub-combination, or all of the elements, without necessarily excluding any additional elements, and without necessarily requiring all of the elements.

The present application relates to tracking users within a facility. The facility may be a home, an office building, a shopping mall, an amusement park, or the like. The facility may be divided into two or more zones. A zone may be a room, a sub-divided area, an office cubicle, or a building floor, among other examples. For instance, a facility may have 5 levels and each level may be designated a zone (e.g., 5 zones total). In another example, a facility may be a single level building having 5 rooms and each of the rooms may be designated a zone (e.g., 5 zones total).

In some examples, systems and methods may track a mobile device associated with a user. The location of the mobile device may be a proxy for tracking the location of that user. Mobile devices may include smartphones, portable computers, wearable computing devices (e.g., smart watch, wearable activity monitor, or the like), or any other type of computing device that may have a communication module for communicating with another computing device. Such systems and methods require a user to carry an assigned mobile device. In scenarios where the user may have forgotten the assigned mobile device in their office, at their desk, etc. or where the user may have lent their assigned mobile device to another user, such systems may fail to accurately track the intended user.

The present application relates to systems and methods of tracking users within a facility. The facility may have a plurality of network-connected acoustic devices installed therein. The facility may include two or more zones and each zone may be associated with a respective acoustic device that is located therein. The respective acoustic devices may be positioned at known locations, such as a meeting room, at a user assigned desk or office, or any other zone within the facility.

In some examples, the acoustic devices may be smart speaker devices that receive and process acoustic input or voice commands and conduct an operation based on the received acoustic input. An acoustic device may include a microphone device that receives acoustic input. Further, the acoustic device may include an output transducer, such as a loudspeaker, for playback of acoustic signals. When the acoustic device is positioned at a known location, a system in communication with the acoustic device may determine that received acoustic input originates from the known location.

In some examples, an acoustic device or a computing server in communication with the acoustic device may identify users based on voice recognition or voice printing. For example, voice recognition or voice printing operations, when executed, may cause a processor to compare voice characteristics of received acoustic input to voice characteristics from previously acquired voice samples of registered users. To increase accuracy of identifying a user location within a facility, systems and methods are provided that track users within a facility based on acoustic input in combination with contextual data associated with a user.

Reference is made to FIG. 1, which illustrates, in block diagram form, a system 100 for tracking users within a facility, in accordance with an example of the present application. The facility may include two or more zones. For example, the facility may be a building and the building may be sub-divided into two or more rooms or zones. Each zone may be associated with a respective acoustic device of a plurality of network-connected acoustic devices.

The system 100 may include a location tracking server 110 and a plurality of acoustic devices 120 (illustrated individually as 120a, 120b, . . . , 120n). In some examples, the system 100 may include a communication server 130 and one or more client devices 140. In some examples, the communication server 130 may be a Microsoft Exchange™ server or the like for managing electronic mail (e-mail) communication messages and a global address list (GAL). The communication server 130 may manage e-mail communication messages, calendar data, address data, other messaging data, etc. for the one or more client devices 140. In some examples, the respective client devices 140 may be assigned to a respective user. The location tracking server 110, the plurality of acoustic devices 120, the communication server 130, and the one or more client devices 140 may be part of a network domain or within a local area network for a company.

The system 100 includes a network 150. The location tracking server 110 may be configured to communicate with the plurality of network-connected acoustic devices 120 over the network 150. Further, the communication server 130 and the one or more client devices 140 may be configured to communicate, via the network 150, with the location tracking server 110 or the plurality of network-connected acoustic devices 120, or any other computing devices. The network 150 may include one or a combination of interconnected wired or wireless networks, including the Internet, wireless local area networks, wireless area networks, short-range communication networks, or the like.

A facility may include two or more facility zones and each facility zone may be associated with a respective acoustic device of a plurality of network-connected acoustic devices 120. In FIG. 1, each respective acoustic device may communicate with the location tracking server 110 over the network 150.

In some examples, the plurality of network-connected acoustic devices 120 may be configured as a mesh network (not illustrated in FIG. 1). For instance, the first acoustic device 120a may communicate with the second acoustic device 120b via a short-range communication channel between the acoustic devices. In the event that the second acoustic device 120b may be unable to communicate with the location tracking server 110 via the network 150, the second acoustic device 120b may communicate with the location tracking server 110 via a communication path including the first acoustic device 120a and the network 150.

Each respective acoustic device 120 may be positioned within an assigned zone of the facility. A first user may be assigned an office or a desk and the first acoustic device 120a may be positioned at a first zone. In some examples, the first acoustic device 120a may detect and receive acoustic input of the first user and, based on numerous voice samples collected over time, the first acoustic device 120a may generate a first voice print database associated with the first user. In some examples, the first acoustic device 120a may transmit the voice print database to the location tracking server 110. Similarly, other respective users may be assigned at a respective desk and a corresponding acoustic device may be positioned in a respective zone. In some examples, one or more acoustic devices 120 may be positioned within an assigned zone that is a common area or a zone that is not assigned to a particular user.

The location tracking server 110 may be a single server, multiple servers, a server farm, or any other such arrangement of computing devices to implement computing server-like functionality. The location tracking server 110 includes one or more processors, memory, and a communication module for providing communications capability with other computing devices, such as the acoustic devices described herein. The location tracking server 110 includes processor executable instructions stored in memory that, when executed, cause a processor to track users within a facility.

The location tracking server 110 may include a user location application 112 having processor executable instructions stored in memory that, when executed, cause a processor to conduct operations described herein for tracking users within the facility. For example, the processor executable instructions may configure the processor to receive a first acoustic input from a first acoustic device 120a associated with a first zone, determine that the first acoustic input is associated with a first user, and associate the first acoustic input with the first user. Using contextual data of the first user, the processor may confirm the association of the first acoustic input with the first user and associate a location of the first user with the first zone. Other example operations associated with the user location application 112 are described herein.

The location tracking server 110 may include an acoustic application 114. The acoustic application 114 may include processor executable instructions for receiving signals from the plurality of acoustic devices 120 and for decoding and processing acoustic signals. For example, the acoustic application 114 may include instructions for converting speech-to-text based on acoustic signals. The acoustic application 114 may also include instructions for processing received acoustic commands and conducting operations based on the received acoustic commands Other acoustic related operations are contemplated. In FIG. 1, the user location application 112 and the acoustic application 114 are illustrated as separate applications; however, in some examples, operations of the user location application 112 and the acoustic application 114 may be part of the same application.

The location tracking server 110 may include one or more location records 116. A location record may be a data structure for storing data relating to a user and an identified user location corresponding to that user. In some examples, the location record 116 may also include a date/time stamp associated with the identified user location.

In some examples, the server 110 may store a location record 116 for each registered or identified user and the server 110 may update the location record 116 as new user location information becomes available. For instance, the location record 116 for an identified user may include a running log of the user location over time. As will be described in some examples herein, it may be desirable to identify a current user location with a confidence level greater than a threshold level. Being able to identify the current user location may be desirable in scenarios where the server 110 may route acoustic messages to a target acoustic device proximal to the identified user for playback and without having to require identity verification of the identifier user at the target acoustic device.

The communication server 130 includes one or more processors, memory, and a communication module for providing communication capability with other computing devices. In some examples, the communication server 130 may include an exchange application 132 for managing e-mail communication messages, a global address list for the one or more client devices 140 and/or calendars for respective users of client devices 140. The exchange application 132 may manage any other type of data. The exchange application 132 may have instructions for connecting with the location tracking server 110 and interacting with the user location application 112.

In some examples, the communication server 130 may be a Microsoft Exchange™ server for managing employee e-mail accounts and/or employee calendar information for a company. In some examples described herein, the communication server 130 may be a source of contextual data associated with an identified user. For example, the communication server 130 may store user records 134. A user record 134 may be characterized as data structures for storing data associated with a user account. In some examples, the communication server 130 may store a user record 134 for each registered user (e.g., each employee of a company). The user record 134 may include calendar information corresponding to where the user plans to be (e.g., client meeting in Meeting Room A or team meeting in the Building C cafeteria). Further, the user record 134 may be associated with e-mail or other types of message communications for providing contextual information regarding potentially where the user might be at a specified time (e.g., email correspondence with a colleague to meet in an engineering lab to showcase a prototype).

FIG. 1 illustrates a first acoustic device 120a, a second acoustic device 120b, and an Nth acoustic device 120n. It may be understood that the system 110 may include any number of acoustic devices. Within a facility, the respective zones may include one or more acoustic devices located therein. That is, a first zone may be associated with a first acoustic device 120a and the first acoustic device 120a may detect and receive acoustic input that is generated from within or proximal to the first zone. In some other examples, a zone may include two or more acoustic devices therein. Where a zone may be particularly large, the zone may include two or more acoustic devices for concurrently detecting and receiving acoustic input for that particularly large zone.

The plurality of acoustic devices 120 may be smart speaker devices that receive and process acoustic input or voice commands and conduct an operation based on the received acoustic input. For example, an acoustic device may include a microphone device that detects and receives acoustic input. Further, the acoustic device may include an output transducer, such as a loudspeaker, for playback of acoustic signals. To illustrate, the acoustic devices 120 may be any one or a combination of smart speaker devices, such as devices known as Amazon Echo™, Apple HomePod™, Google Home™, Sonos One™, or like devices. It may be appreciated that acoustic devices 120 may be other computing devices having a microphone device, a loudspeaker device, and computing functionality for receiving voice commands, executing voice commands, and/or providing acoustic feedback.

The system 100 may include a client device 140. The client device 140 includes one or more processors, memory, and a communication module for providing communication capability with other computing devices. The client device 140 may be a personal computer, a smartphone, or any other type of computing device that may be configured to store data and software instructions and execute software instructions.

The client device 140 may be assigned to a particular user. For instance, the client device 140 may be a desktop computer assigned by a company to a user. In some examples, as the client device 140 may be assigned to a particular user, the location tracking server 110 may obtain contextual data associated with the particular user based on an operating state of the client device 140. To illustrate, contextual data may include data indicating whether the client device 140 is electronically locked (e.g., Microsoft Windows™ lock screen) or whether the client device 140 is actively being used (e.g., indicating whether the particular user sitting at their assigned desk and using the computing device). Other data indicators from the client device 140 or any other computing device of the system 110 as contextual data associated with a registered user may be contemplated.

Figure 2:
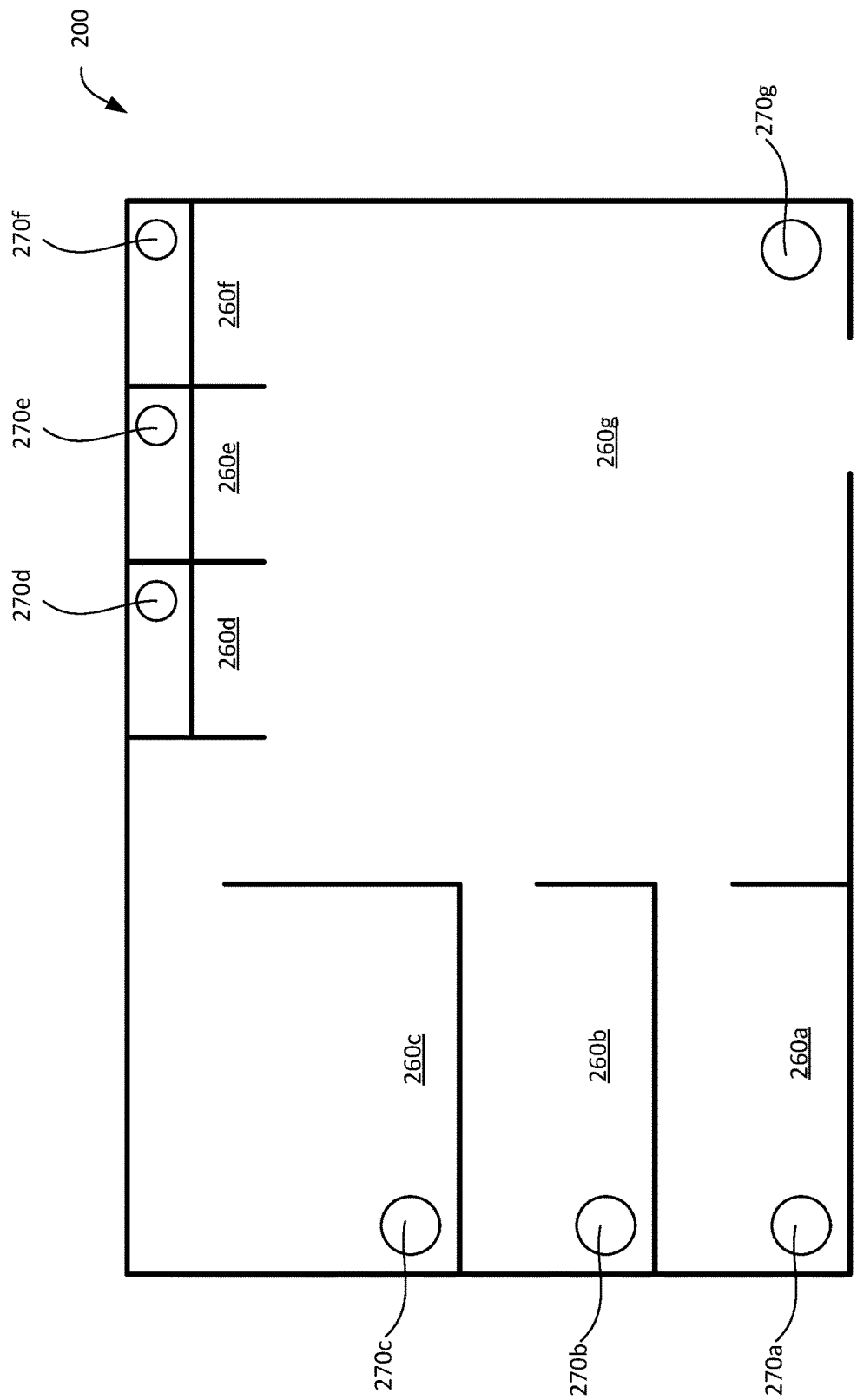
FIG. 2 illustrates a top plan view of a facility, in accordance with an example of the present application.

Reference is made to FIG. 2, which illustrates a top plan view of an example facility 200, in accordance with an example of the present application. The facility 200 may be subdivided into two or more zones. In FIG. 2, the facility 200 includes a first zone 260a, a second zone 260b, and a third zone 260c, which in some examples may be meeting rooms in a company building. Further, the facility 200 may include a fourth zone 260d, a fifth zone 260e, and a sixth zone 260f, which in the present example may be user assigned cubicles or desks. The facility may also include a seventh zone 260g, which may be a common area for the company building. It may be appreciated that the facility 200 of FIG. 2 is illustrative and that there may be a greater number or a lesser number of zones and that the facility layout may be any other layout.

Each respective zone may be associated with a respective acoustic device of a plurality of network-connected acoustic devices 120 (FIG. 1). For example, the first zone 260a may have a first acoustic device 270a located therein. That is, the first zone 260a is associated with the first acoustic device 270a. Similarly, the second zone 260b, the third zone 260c, the fourth zone 260d, the fifth zone 260e, and the sixth zone 260f may be associated with a second acoustic device 270b, a third acoustic device 270c, a fourth acoustic device 270d, a fifth acoustic device 270e, and a sixth acoustic device 270f, respectively. Further, the seventh facility zone 260g (e.g., common area) may be associated with a seventh acoustic device 270g.

In FIG. 2, the acoustic devices may communicate with the location tracking server 110 (FIG. 1) via the network 150 (FIG. 1). In some other examples, the respective acoustic devices may also communicate with other acoustic devices via short-range communication channels in a mesh network configuration.

In the illustrated example, the fourth zone 260d, fifth zone 260e, and the sixth zone 260f may be desks or cubicles assigned to particular users. Accordingly, the acoustic devices positioned within the respective zones may, over time, generate a database or collection of voice prints associated with particular users such that the voice prints may be used for subsequently acoustically identifying a user's acoustic input.

The zones that may be meeting rooms (e.g., first zone 260a, second zone, 260b, or third zone 260c) may not be assigned to any particular user. As numerous users may utilize the room throughout a day, the third acoustic device 270c, for example, may not be suited for generating an appreciable database of voice prints for any particular user.

Figure 3:
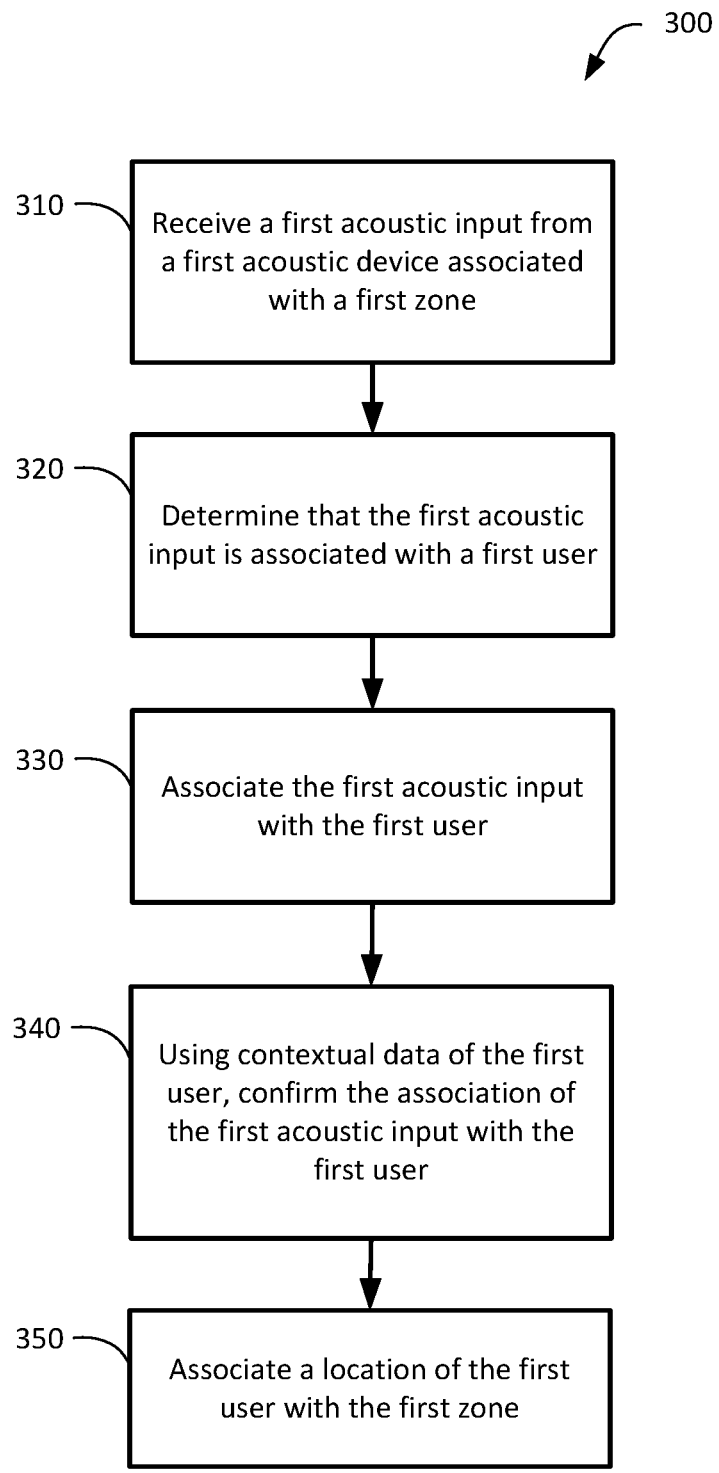
FIG. 3 illustrates, in flowchart form, a method of tracking users within a facility, in accordance with an example of the present application.

Reference is made to FIG. 3, which illustrates, in flowchart form, a method 300 of tracking users within a facility, in accordance with an example of the present application. The method 300 includes operations that are carried out by one or more processors of the location tracking server 110 (FIG. 1). The method 300 may be implemented, at least in part, through processor executable instructions associated with the user location application 112 or the acoustic application 114 (FIG. 1). In some examples, one or more operations may be implemented via processor-executable instructions in other applications or in an operating system stored and executed in memory of the location tracking server 110.

To illustrate features of the present application, operations of the method 300 will be described alongside an example with reference to the facility 200 of FIG. 2. A first user named John may be assigned to a desk associated with the fourth zone 260d. The fourth zone 260 may include the fourth acoustic device 270d located therein. As John may spend several hours a day speaking on the telephone or with colleagues or working on a computer assigned to John, the fourth acoustic device 270d may detect and store voice prints based on acoustic input from John (e.g., first user) while John is working at John's assigned desk. In some examples, voice prints may include data representing voice characteristics, etc.

In some examples, the fourth acoustic device 270d may transmit to the location tracking server 110 the collection of voice print data and the location tracking server 110 may store the voice print data in association with a location record 116 assigned to John. The location tracking server 110 may conduct operations for determining that subsequent acoustic input may be associated with John.

At operation 310, the processor receives a first acoustic input from a first acoustic device 270a associated with a first zone 260a. The first zone 260a may be a meeting room or a common area for employees to congregate to discuss project ideas. In the present example, John may be meeting with colleagues in the first zone 260a and he may be speaking. The first acoustic device 270a may detect acoustic input and may transmit the first acoustic input to the location tracking server 110. The location tracking server 110 may determine that the first acoustic input was received in the first zone 260a at least because the first acoustic input was received from the first acoustic device 270a.

At operation 320, the processor determines that the first acoustic input is associated with the first user. For example, the processor may determine that the first acoustic input is associated with the first user based on voice recognition. The processor may conduct operations associated with the acoustic application 114 for comparing voice characteristics extracted from the first acoustic input to voice characteristics from voice prints that may be stored and associated with the first user. It will be understood that other voice recognition or voice printing operations may be contemplated for determining that the first acoustic input is associated with the first user.

Further, in some examples, the acoustic device from which an acoustic input was received may conduct voice recognition operations for generating an indication that the first user may be the speaker. Thus, this acoustic device may transmit the indication to the location tracking server 110 and the location tracking server may determine that the first acoustic input is associated with the first user.

In the present example, the location tracking server 110 may have already stored several voice prints associated with John (e.g., collected from the fourth acoustic device 270d located at the fourth zone that is assigned to John). The voice prints may be compared to the first acoustic input and, subsequently, be associated with the first user.

In some examples, accuracy of voice recognition operations for determining that acoustic input may be associated with a particular user may be dependent on the comprehensiveness of a voice print database for the particular user, the robustness of the voice recognition operations, and/or other factors. In some examples, the processor (e.g., at operation 320) may determine that the first acoustic input is associated with a first user based on voice recognition, but the determination may be based on incorrect associations. Thus, it may be desirable to increase the certainly level of the association between the first acoustic input and the first user.

At operation 330, the processor associates the first acoustic input with the first user.

Using contextual data of the first user, the processor, at operation 340, confirms the association of the first acoustic input with the first user. In some examples, in response to determining that the first acoustic input is associated with the first user or in response to associating the first acoustic input with the first user, the processor may obtain contextual data associated with the first user. In some examples, contextual data may include data corresponding to the first user. The contextual data of the first user may be from a device that is other than the first acoustic device 270a. Contextual data may include data that provides an indication to corroborate the association of the first acoustic input to the first user, thereby increasing the certainty level that the association between the first acoustic input and the first user is correct. In some examples, the contextual data may be used to confirm an association of the first acoustic input with the first user.

For example, the processor may obtain contextual data associated with the first user from the communication server 130, such as a Microsoft Exchange™ server, and the contextual data may include at least one of calendar data, address book, or messaging data associated with the first user. The communication server 130 may store a user record 134 corresponding to the first user. For instance, the communication server 130 may store calendar data associated with John, where the calendar data may include a meeting invitation that John had accepted and a time and location of the accepted meeting. In the present example, the calendar data associated with John may indicate that John is scheduled to attend a meeting in the first zone 260*a* at 10 am. Thus, the contextual data may include obtained information about the user accepted meeting invitation(s), where the information may be stored at the communication server 130.

In some other examples, the processor may obtain contextual data associated with the first user based on data from other computing devices or based on a user record 134 (FIG. 1) associated with the first user. For instance, the processor may obtain data from a client device 140 that is assigned to the first user. The client device 140 may be a desktop computer located at John's desk in the fourth zone 260*d* and the processor may obtain data indicating whether the desktop computer is be electronically locked.

In the scenario that the desktop computer is electronically locked, the processor may deduce that John is not be at his desk (e.g., the fourth zone 260*d*), thereby further corroborating prior operations that associate the first acoustic input received in the first zone 260*a* with John. In the scenario that the desktop computer is not electronically locked and that the desktop computer is being actively used, the processor may deduce that John may be at his desk working away. Accordingly, the location tracking server 110 may deduce that the first acoustic input received in the first zone 260*a* is not from John (e.g., the first user).

It may be appreciated that when the contextual data indicates that the desktop computer may not be electronically locked, the contextual data may not determine with certainty that John is at his desk. For instance, John may have granted permission to another colleague to utilize his computer, as John and the colleague may be working on a time-sensitive project together. Accordingly, in some examples, contextual data may be associated with a weighting factor and some sources of contextual data may be associated with a higher weighting factor than other sources of contextual data. For instance, contextual data indicating that the desktop computer assigned to John is unlocked and that the desktop computer is actively being used may have a higher weighting factor than a weighting factor associated with contextual data indicating that John is scheduled to attend a meeting in the first zone 260*a*. In some instances, calendar entries may be a user's plan to attend a meeting at a particular zone; however, the first user may be drawn to other matters and fail to attend the planned meeting at the particular zone.

In some examples, the processor determines a certainty score associated with the first user being proximal to the first zone based on the received first acoustic input and the obtained contextual data. Continuing with the above described example, in the scenario where the location tracking server 110 may have accumulated numerous voice prints associated with the first user and where the location tracking server 110 may have obtained data from the client device 140 (e.g., desktop computer assigned to John) that the client device 140 is electronically locked, the processor may determine a certainty score of 90/100, thereby indicating that there is a high likely hood that John has been identified to be in the first zone 260*a*. The above example describes the certainty score as a numerical value out of 100; however, other certainty score scales or measures are contemplated. In some examples, the processor may confirm the association of the first acoustic input with the first user when the certainty score meets a threshold certainty score. For instance, the processor may confirm the association of the first acoustic input with the first user when the certainty score is greater than 85/100.

At operation 350, the processor associates a location of the first user with the first zone. For example, the processor may update a location record based on the certainty score. For example, the location tracking server 110 may be storing a location record 116 associated with the first user. The processor may update the location record to indicate that the first user is currently located in the first zone 260*a*. In some examples, the processor may also update the location record with a time/date stamp and with the determined certainty score.

In some examples, the processor may be configured to update the location record when the certainty score is greater than a threshold value. For example, the threshold value may be 85/100. Thus, in a scenario where the processor may determine that a certainty score associated with the first user being proximal to the first zone is less than 85/100, the processor may not update the location record. In some examples, a certainty score less than the threshold value may be caused by a relatively scant voice print collection associated with the first user, thereby decreasing the likelihood that the processor accurately identifies acoustic input from the first user. Alternatively, the certainty score may be less than the threshold value due to the contextual data being associated with a relatively low weighting factor.

In the above described example, the first acoustic input was received from the first user named John. In some other examples, the first acoustic input may be received from a second user distinct from the first user. To illustrate, the operations of method 300 will be discussed again alongside an example in which the acoustic input is received from a second user distinct from the first user.

At operation 310, the processor may receive the first acoustic input: "Hey John, are you going to the 3 pm meeting today?" from the first acoustic device 260*a*. The aforementioned expression may be provided by Jane (e.g., John's colleague).

At operation 320, the processor may determine that the first acoustic input is associated with the first user (John) based on speech content analysis of the first acoustic input. For example, the location tracking server 110 may execute operations of the acoustic application 114 (FIG. 1) for identifying that John is a subject of the expression "Hey John, are you going to the 3 pm meeting today?" The processor may also determine that the first acoustic input is associated with Jane based on voice recognition operations. Additionally, the processor may identify that the expression "Hey John, are you going to the 3 pm meeting today?" may generally be about a meeting and that meeting information may relate to calendar data stored on the communication server 130.

In response to determining that the first acoustic input is associated with the first user, the processor, at operation 330, may associate the first acoustic input with the first user. Further, the processor may obtain contextual data associated with the first user (John). For example, the processor may obtain calendar data from the communication server 130. The location tracking server 110 may receive two sets of calendar data for two company employees with a given name 'John' (e.g., John Smith and John Jones). Furthermore, the processor may also obtain contextual data associated with the second user (Jane), where the contextual data may include any of the example contextual data described herein.

Using the contextual data of the first user (John), the processor, at operation 340, the processor confirms the association of the first acoustic input with the first user. For example, the processor may determine a certainty score associated with the first user being proximal to the first zone 260*a* based on the received first acoustic input and the obtained contextual data. Continuing with the present example, the processor may determine that only one of the two employees with the given name 'John' has a 3 pm meeting. Thus, the processor may determine a relatively high certainty score to be associated with one of the employees named 'John' as being the first user proximal to the first zone 260a, thereby confirming the association of the first acoustic input with the first user.

At operation 350, the processor associates the location of the first user with the first zone. For example, the processor may update the location record for both John and Jane based on the certainty score. For example, a location record for the identified 'John' as being the first user proximal the first zone 260a may be updated with the identified location. Further, the location record for the identified "Jane" may also be updated with the identified location.

In the above described examples, the received acoustic input (e.g., at operation 310) may be speech input. In some other examples, the first acoustic input may include non-speech input. To illustrate, John may now be working at his desk located in the fourth zone 260d. Accordingly, at operation 310, the processor receives non-speech input from the fourth acoustic device 270d associated with the fourth zone 260d. For example, the non-speech input may include keyboard typing sounds or paper rustling sounds. The processor, at operation 320, may determine that the non-speech input received from the fourth acoustic device 270d may be associated with John because the fourth zone 260d is John's assigned workstation. Further, the processor, at operation 330, associates the non-speech input with John. Further, the processor may identify from project plan data received from the communication server 130 and/or the client device 140 that John may be working on a major end-of-day project deadline (e.g., inference that John would be actively working on the document). In addition or alternatively, the processor may determine that the client device 140 assigned to John is unlocked and actively being used. Thus, using the contextual data, such as the project plan data or information that the client device 140 that is assigned to John is unlocked, the processor, at operation 340, may confirm the association of the non-speech input with John. That is, the processor may determine a certainty score based on contextual data of John indicating that he may be proximal to the fourth zone 260d. At operation 350, the processor associates the location of John with the fourth zone 260d. That is, the processor, at operation 350, may update the location record associated with John based on the certainty score.

In another example, the processor may detect a lack of acoustic input from the fourth acoustic device 270d or sounds indicating that the user assigned to the fourth zone 260d may be leaving the fourth zone 260d. Further, the processor may receive acoustic input from the first acoustic device 270a (e.g., positioned in a first zone 260a—meeting room). The processor may identify using voice recognition based on acoustic input from the first acoustic device 270a that the first user may be in the first zone 260a. Further, the processor may retrieve contextual data based on acoustic input from a prior point in time from one of the acoustic devices, such as acoustic input of the first user explaining to a colleague: "Hey, I'll talk to you later. I need to run to join a conference call in meeting room one." Thus, the processor may determine a certainty score associated with the first user being proximal to the first zone 260a based on the various aforementioned acoustic input and the obtained contextual data.

In comparison to relying solely on voice recognition or voice printing operations, the example methods and systems described herein may track users within a facility with increased accuracy. For instance, the users may be tracked based on a combination of acoustic input and contextual data associated with a user. Accordingly, when the user is proximal to an acoustic device and begins speaking, the location tracking server 110 may identify the user with a confidence level greater than a threshold level without needing to conduct operations relating to user identity handshake at the respective acoustic devices.

In some examples, John may choose to share John's location within the facility with other employee users. Accordingly, the location tracking server 110 may continually update location records 116 based on operations described herein and may transmit, to one or more client devices 140, in real time or near real time John's location information.

In some examples, the location tracking server 110 may generate, based on location records 116, a log of employee attendance at meetings held in a meeting room or zone of the facility.

Figure 4:
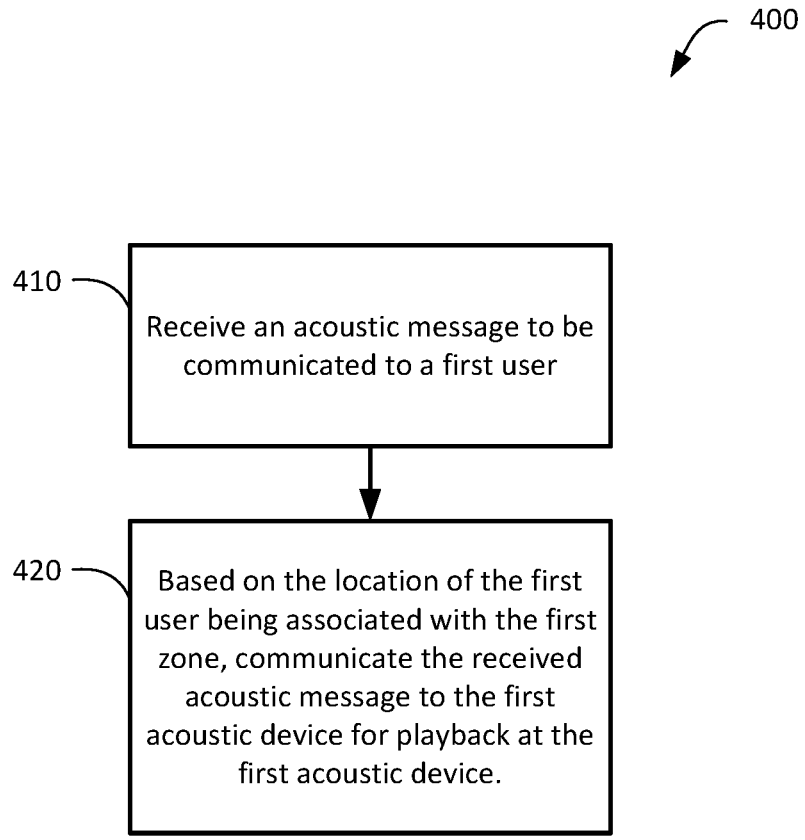
FIG. 4 illustrates, in flowchart form, a method of tracking users within a facility, in accordance with another example of the present application.

In some examples, it may be desirable for a first employee user to initiate a voice chat with a second employee user, where the acoustic output may be played back on an acoustic device most proximal to the second employee user. To illustrate, reference is made to FIG. 4, which illustrates, in flowchart form, a method 400 of tracking users within a facility, in accordance with another example of the present application. The method 400 includes operations that are carried out by one or more processors of the location tracking server 110 (FIG. 1). The method 400 may be implemented, at least in part, through processor executable instructions associated with the user location application 112 (FIG. 1) and/or the acoustic application 114. In some examples, one or more operations may be implemented via processor-executable instructions in other applications or in an operating system stored and executed in memory of the location tracking server 110.

At operation 410, the processor receives an acoustic message to be communicated to the first user.

At operation 420, based on the location of the first user being associated with the first zone, communicate the received acoustic message to the first acoustic device 270a (FIG. 1) for playback at the first acoustic device 270a.

In some examples, the operations of the method 400 may be conducted after the operations of the method 300 of FIG. 3. That is, the operations of the method 400 may be conducted subsequent to the location tracking server 110 determining a location of a user who is an intended recipient of a voice message or voice chat. In an illustrative example, a third user named Stephanie may want to initiate a voice chat with a first user named John. Referring again to FIG. 2, Stephanie may be located in the third zone 260c while John may be located in the first zone 260a. As the location tracking server 110 may have conducted at least one iteration of the method 300 of FIG. 3 for identifying the location of John, the location tracking server 110 may route a voice chat to the first acoustic device 270a. The first acoustic device 270a may be nearest to John.

The processor may receive, from the third acoustic device 270c, a third acoustic input associated with a third user representing a request to transmit an acoustic message to the first user. That is, the processor may receive an acoustic message to be communicated to the first user (John). Continuing with the example above, Jane may initiate a voice chat by saying: "Find John—Hey John, where abouts are you?" In some examples, the expression "Find John" may be an initialization command for activating an acoustic device. The processor may conduct speech content analysis on the expression "Hey John, where abouts are you?" to determine that Jane desires to initiate a voice chat with John, the first user. Other example voice commands or expressions are contemplated.

The processor may identify, based on the location record 116 (FIG. 1), a target zone corresponding to a current location of the first user. For example, the processor may query a location record 116 that includes a running log of John's location within the facility over time and identify the most recent user location associated with John. In the current example, the processor may determine that John may be proximal to the first acoustic device 270a in the first zone 260a.

The processor may transmit a playback signal to a target acoustic device associated with the target zone representing the acoustic message for the first user. For example, the processor transmits the playback signal representing the expression "Hey John, where abouts are you?" to the first acoustic device 270a (e.g., identified as the target acoustic device) associated with the first zone 260a. In the present example, the expression "Hey John, where abouts are you?" may be played back on the first acoustic device 270a. As John may be located proximal to the first acoustic device 270a, John may hear the voice message from Jane. Subsequently, the location tracking server 110 may conduct operations for receiving acoustic input from John so he may continue the voice chat with Jane based on operations of the method 300 of FIG. 3 and the method of FIG. 4. In the present example, the location tracking server 110 may determine a user location with a threshold assurance level and may conduct operations for enabling communication channels among users within the facility without needing to conduct further identity validation operations.

Figure 5:
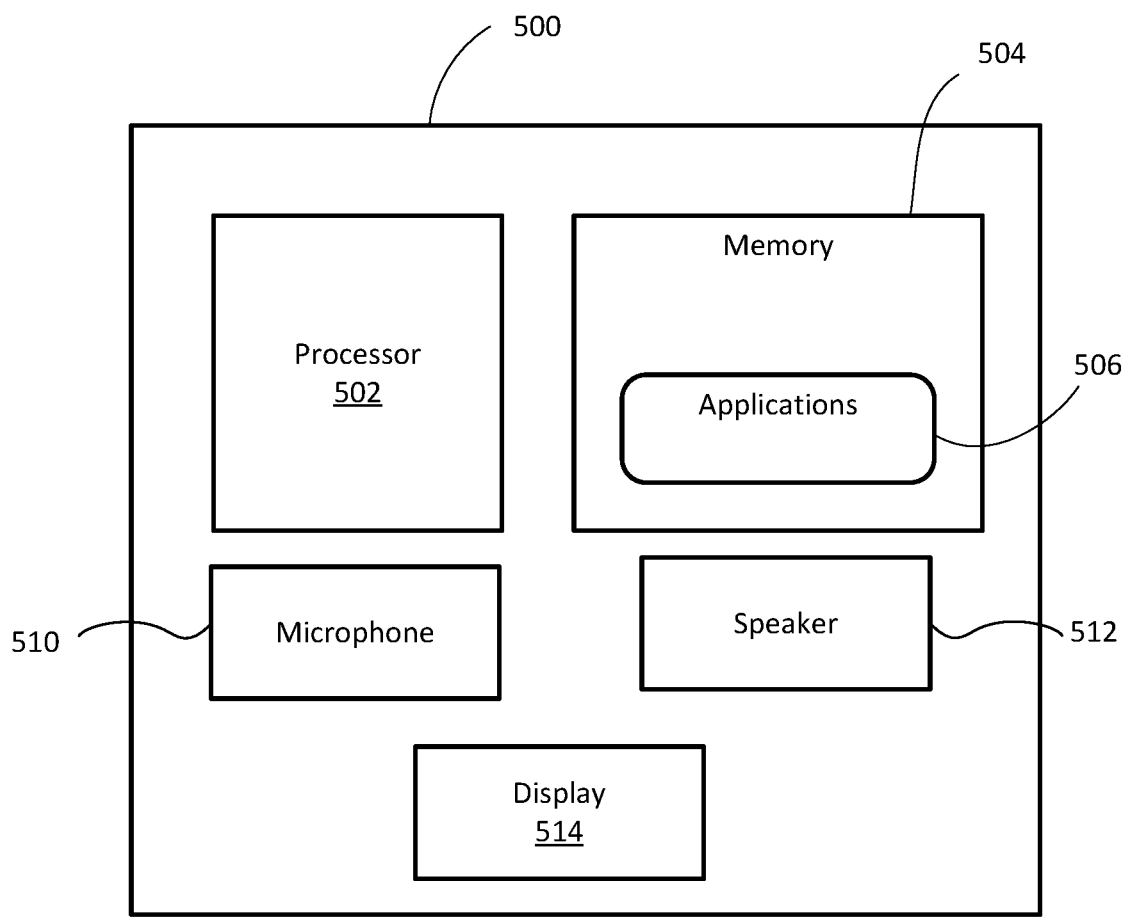
FIG. 5 illustrates, in simplified block diagram form, an electronic device, in accordance with an example of the present application.

Reference is made to FIG. 5, which illustrates, in simplified block diagram form, an electronic device 500, in accordance with an example of the present application. The electronic device 500 may be one of the plurality of network-connected acoustic devices 120 of FIG. 1. In some examples, the electronic device 500 may be the client device 140 of FIG. 1.

The electronic device 500 includes one or more processors 502, memory 504, and a communications module for providing network capabilities to communicate with other computing devices. The memory 504 may store processor executable software applications 506 that may include an operating system to provide basic device operations. The software applications 506 may also include instructions implementing operations of the methods described herein.

The electronic device 500 includes a microphone 510. The microphone 510 may be an electro-mechanical transducer for detecting and receiving acoustic input. The electronic device 500 may also include a speaker 512. The speaker 512 may be a transducer for playing back acoustic signals. The electronic device 500 may include a display interface and/or a display 514. The display 514 may be any suitable display such as a liquid crystal display (LCD), an e-ink/e-paper display, or the like. In some examples, the display 514 is a touchscreen display.

In the example where the electronic device 500 is one of the plurality of network-connected acoustic devices 120, the electronic device 500 may be a smart speaker device that may receive, decipher, and execute voice commands Smart speakers may include any one of devices known as Amazon Echo™, Apple HomePod™, Google Home™, Sonos One™, or like devices. Acoustic devices 120 may be other computing devices having a microphone device, a loudspeaker device, and computing functionality for receiving voice commands, executing voice commands, and/or providing acoustic feedback.

In the example where the electronic device 500 is the client device 140, the electronic device 500 may be a portable electronic device, such as a smartphone, a personal computer, a personal digital assistant, a portable navigation device, a wearable computing device (e.g., smart watch, wearable activity monitor, or the like), or any other type of computing device that may be configured to store data and software instructions, and execute software instructions to perform example operations described herein. In some examples, the electronic device 500 may include a further input module (not illustrated in FIG. 5) for receiving input from a user.

Figure 6:
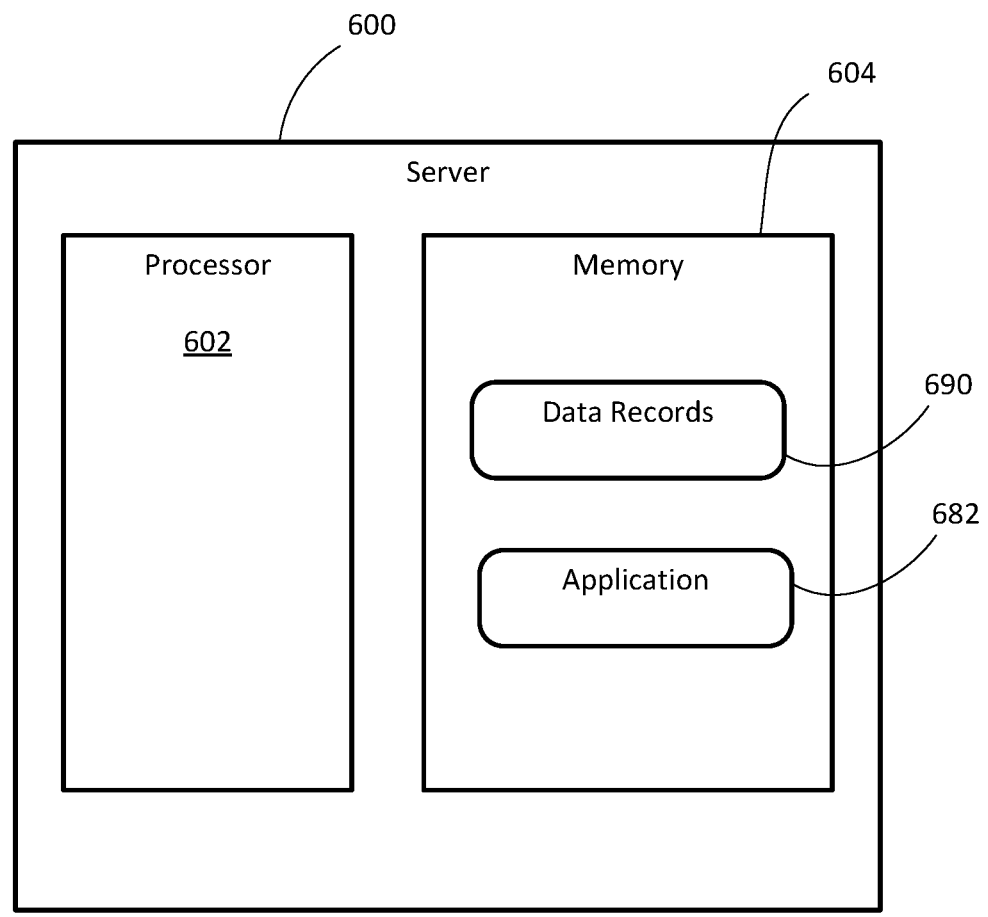
FIG. 6 illustrates, in simplified block diagram form, a server, in accordance with an example of the present application.

Reference is made to FIG. 6, which illustrates, in simplified block diagram form, a server 600, in accordance with an example of the present application. The server 600 may be the location tracking server 110 of FIG. 1 or the communication server 130 of FIG. 1. The server 600 includes one or more processors 602, memory 604, and a communications module for providing network capabilities to communicate with other computing devices. The memory 604 may include data records 690. In the example of the location tracking server 110 of FIG. 1, the data records 690 may be the location records 116 (FIG. 1). In the example of the communication server 130, the data records 690 may be the user records 134 (FIG. 1).

The memory 604 also includes applications 682 having instructions for performing the operations described herein. In the example of the location tracking server 110, the applications 682 may include the user location application 112 and/or the acoustic application 114 described with reference to FIG. 1. In the example of the communication server 130, the applications 682 may include the exchange application 132.

Example embodiments of the present application are not limited to any particular operating system, system architecture, mobile device architecture, server architecture, or computer programming language.

It will be understood that the applications, modules, routines, processes, threads, or other software components implementing the described method/process may be realized using standard computer programming techniques and languages. The present application is not limited to particular processors, computer languages, computer programming conventions, data structures, or other such implementation details. Those skilled in the art will recognize that the described processes may be implemented as a part of computer-executable code stored in volatile or non-volatile memory, as part of an application-specific integrated chip (ASIC), etc.

Certain adaptations and modifications of the described embodiments may be made. Therefore, the above discussed embodiments are considered to be illustrative and not restrictive.

What is claimed is:

1. A system for tracking users within a facility, the facility including two or more zones, each zone being associated with a respective acoustic device of a plurality of network-connected acoustic devices, the system comprising:
   a communication module;
   a processor coupled to the communication module; and
   memory coupled to the processor storing processor executable instructions that, when executed, cause the processor to:

receive a first acoustic input from a first acoustic device located within and associated with a first zone;
identify a first user as the source of the first acoustic input;
using contextual data of the first user, confirm the first user as the source of the first acoustic input; and
determine a location of the first user to be the first zone based on the confirmed identification of the first user as the source of the first acoustic input received by the first acoustic device.

2. The system of claim 1, wherein the contextual data of the first user is from a device other than the first acoustic device.

3. The system of claim 1, wherein the first acoustic input includes speech input, and wherein the contextual data includes at least one of calendar data, address data, or messaging data associated with the first user.

4. The system of claim 1, wherein identifying a first user as the source of the first acoustic input is based on speech content analysis of the first acoustic input.

5. The system of claim 1, wherein confirming the first user as the source of the first acoustic input includes determining that a certainty score is greater than a threshold, wherein the certainty score is associated with the first user being proximal to the first zone and is based on the received first acoustic input and the contextual data of the first user.

6. The system of claim 5, wherein determining the location of the first user to be the first zone includes updating a location record based on the certainty score.

7. The system of claim 1, wherein the contextual data is derived from a voice print database associated with the first user.

8. The system of claim 1, wherein identifying a first user as the source of the first acoustic input is based on voice recognition.

9. The system of claim 1, wherein the processor executable instructions, when executed, further configure the processor to:
receive an acoustic message to be communicated to the first user; and
based on the location of the first user being determined to be the first zone, communicating the received acoustic message to the first acoustic device for playback at the first acoustic device.

10. A method of tracking users within a facility, the facility including two or more zones, each zone being associated with a respective acoustic device of a plurality of network-connected acoustic devices, the method comprising:
receiving a first acoustic input from a first acoustic device located within and associated with a first zone;
identifying a first user as the source of the first acoustic input;
using contextual data of the first user, confirming the first user as the source of the first acoustic input; and
determining a location of the first user to be the first zone based on confirming the identification of the first user as the source of the first acoustic input received by the first acoustic device.

11. The method of claim 10, wherein the contextual data of the first user is from a device other than the first acoustic device.

12. The method of claim 10, wherein the first acoustic input includes speech input, and wherein the contextual data includes at least one of calendar data, address data, or messaging data associated with the first user.

13. The method of claim 10, wherein identifying a first user as the source of the first acoustic input is based on speech content analysis of the first acoustic input.

14. The method of claim 10, wherein confirming the first user as the source of the first acoustic input includes determining that a certainty score is greater than a threshold, wherein the certainty score is associated with the first user being proximal to the first zone and is based on the received first acoustic input and the contextual data of the first user.

15. The method of claim 14, wherein determining the location of the first user to be the first zone includes updating a location record based on the certainty score.

16. The method of claim 10, wherein the contextual data is derived from a voice print database associated with the first user.

17. The method of claim 10, wherein identifying a first user as the source of the first acoustic input is based on voice recognition.

18. The method of claim 10, the method further comprising:
receiving an acoustic message to be communicated to the first user; and
based on the location of the first user being determined to be the first zone, communicating the received acoustic message to the first acoustic device for playback at the first acoustic device.

19. A non-transitory computer-readable storage medium storing instructions for tracking users within a facility, the facility includes two or more zones, each zone being associated with a respective acoustic device of a plurality of network-connected acoustic devices, the instructions, when executed by a processor of a system, cause the system to:
receive a first acoustic input from a first acoustic device located within and associated with a first zone;
identify a first user as the source of the first acoustic input;
using contextual data of the first user, confirm the first user as the source of the first acoustic input; and
determine a location of the first user to be the first zone based on the confirmed identification of the first user as the source of the first acoustic input received by the first acoustic device.

20. The non-transitory computer-readable storage medium of claim 19, wherein the instructions, when executed by a processor of a system, further cause the system to:
receive an acoustic message to be communicated to the first user; and
based on the location of the first user being determined to be the first zone, communicating the received acoustic message to the first acoustic device for playback at the first acoustic device.

* * * * *